United States Patent [19]
Williams et al.

[11] Patent Number: 5,317,941
[45] Date of Patent: Jun. 7, 1994

[54] SLITTING OVERWIDTH METAL STRIP

[75] Inventors: Gary J. Williams; Todd E. Stokes; Joseph A. Leigh, all of Ogden; James L. Maag, Clearfield, all of Utah

[73] Assignee: Westinghouse Electric Corp., Pittsburgh, Pa.

[21] Appl. No.: 40,706

[22] Filed: Mar. 31, 1993

[51] Int. Cl.$^5$ .............................................. B26D 1/143
[52] U.S. Cl. ............................................ 83/13; 83/409; 83/425.3; 83/435.2; 198/721; 271/196
[58] Field of Search ................... 83/13, 409, 152, 422, 83/424, 425.2, 425.3, 425.4, 436, 500, 420; 198/721, 803.5; 271/196

[56] References Cited

U.S. PATENT DOCUMENTS

| | | | |
|---|---|---|---|
| 3,682,469 | 8/1972 | Itoh et al. | 271/196 X |
| 3,908,835 | 9/1975 | Lubas | 198/803.5 X |
| 4,398,629 | 8/1983 | Williamson | 198/721 X |
| 4,403,533 | 9/1983 | Cox et al. | 83/435.2 |
| 4,542,672 | 9/1985 | Pearl | 83/409 |
| 4,887,937 | 12/1989 | Thunnissen | 198/721 X |
| 4,954,033 | 9/1990 | Sanders | 271/196 X |

*Primary Examiner*—Rinaldi I. Rada
*Attorney, Agent, or Firm*—J. C. Valentine

[57] ABSTRACT

An overwidth slitting method slits a metal strip into two lengthwise pieces while trimming the side edges from the strip. The metal strip is placed on parallel spaced apart conveyors adjacent a slitter for conveying the strip to the slitter. The conveyors are raised above a plurality of vacuum cups which are disposed between the conveyors and are spaced along the length of the strip. The raised metal strip is aligned with respect to the slitter and the raised conveyors are lowered to a position where the bottom surface of the aligned strip engages the vacuum cups between the conveyors. A vacuum is applied to the vacuum cups for holding the strip in alignment relative to the slitter and then the metal strip is advanced on the conveyors into the slitter while sequentially releasing the vacuum from each vacuum cup engaged with the bottom surface of the metal strip as it advances. The advancing metal strip is simultaneously slit into two lengthwise pieces while the side edges are trimmed therefrom.

8 Claims, 3 Drawing Sheets

SLITTING OVERWIDTH METAL STRIP

BACKGROUND OF THE INVENTION

This invention relates to the slitting of overwidth metal strip and, more particularly, to simultaneously slitting an elongated metal strip into two lengthwise pieces while trimming the side edges of the strip.

Flat mill products such as elongated metal strips having thicknesses of less than about a quarter of an inch and various widths and lengths have long been produced in the ferrous and the nonferrous metal industries. A general discussion of practices and equipment for producing and processing metal strip, including slitting, may be found in the Metals Handbook published by the American Society of Metals ("ASM") and The Making, Shaping And Treating of Steel, presently published by the ASM.

Heretofore in some production facilites, metal strips having thicknesses of more than about one sixteenth of an inch and lengths of up to about twenty-five feet (25') can not be adequately held in alignment on feeding tables or conveyors associated with slitters as they being cut to specification. Thus, for example, in a production facility for shearing zirconium strips having thicknesses of from about one sixteenth of an inch to about one eighth of an inch, and widths of about twenty three inches (23") and lengths of about fifteen feet (15') or more into several pieces and trimming the edge sides of the strip, excessive handling is required because the shear can only cut strips of up to ten foot (10') in length and can only perform one cut at a time. The workmen must move each strip to a shear where they mark three cut lines on the strip. The strip is then loaded onto the shear and double cut (i.e., one cut from the front edge and a second cut from the trailing end) to trim one half inch from the side edge. The strip is then reversed and double cut to trim one half inch from the other side edge. The trimmed strip is then centered in the shear and double cut a third time to shear the strip in half lengthwise. This extensive handling of each strip frequently leads to scratches and other surface defects which are costly to repair.

SUMMARY OF THE INVENTION

It is an object of the present invention to simultaneously slit an overwidth long metal strip into two lengthwise pieces while trimming the side edges of the strip. It is an additional object of the present invention to maintain the alignment of a long metal strip as it advances into a slitter.

With these objects in view, the present invention resides in an improved overwidth slitting method (and apparatus therefore) wherein a metal strip having a width extending between two side edges, a length and a bottom surface is placed on parallel spaced apart conveyors disposed adjacent a slitter for conveying the strip to the slitter. The conveyors are raised above a plurality of vacuum alignment control cups, which are disposed between the parallel conveyors and spaced along the length of the strip. While the conveyors are in the raised position, the metal strip is aligned with respect to the slitter. After aligning, the conveyors are lowered to a position where the bottom surface of the metal strip engages the vacuum cups disposed between the conveyors and a vacuum is applied to the cups for holding the strip in alignment during the slitting process.

The strip on the conveyors is then advanced to the slitter while sequentially releasing the vacuum from each vacuum cup engaged with the bottom surface of the metal strip as it advances through the slitter. The slitter simultaneously slits the metal strip into two lengthwise pieces while it trims the side edges of the strip.

In a preferred practice of the present invention, a zirconium strip having a thickness of from about one sixteenth of an inch to about one eighth of an inch, a width of about twenty-three inches and a length of at least about fifteen feet is simultaneously slit in half lengthwise and one half inch wide side edges are trimmed therefrom.

DESCRIPTION OF THE DRAWINGS

The invention will become more readily apparent from the following description of a preferred practice thereof and means for practicing it is shown, by way of example only, in the accompanying drawings, wherein.

DESCRIPTION OF A PREFERRED PRACTICE

Figure 1:
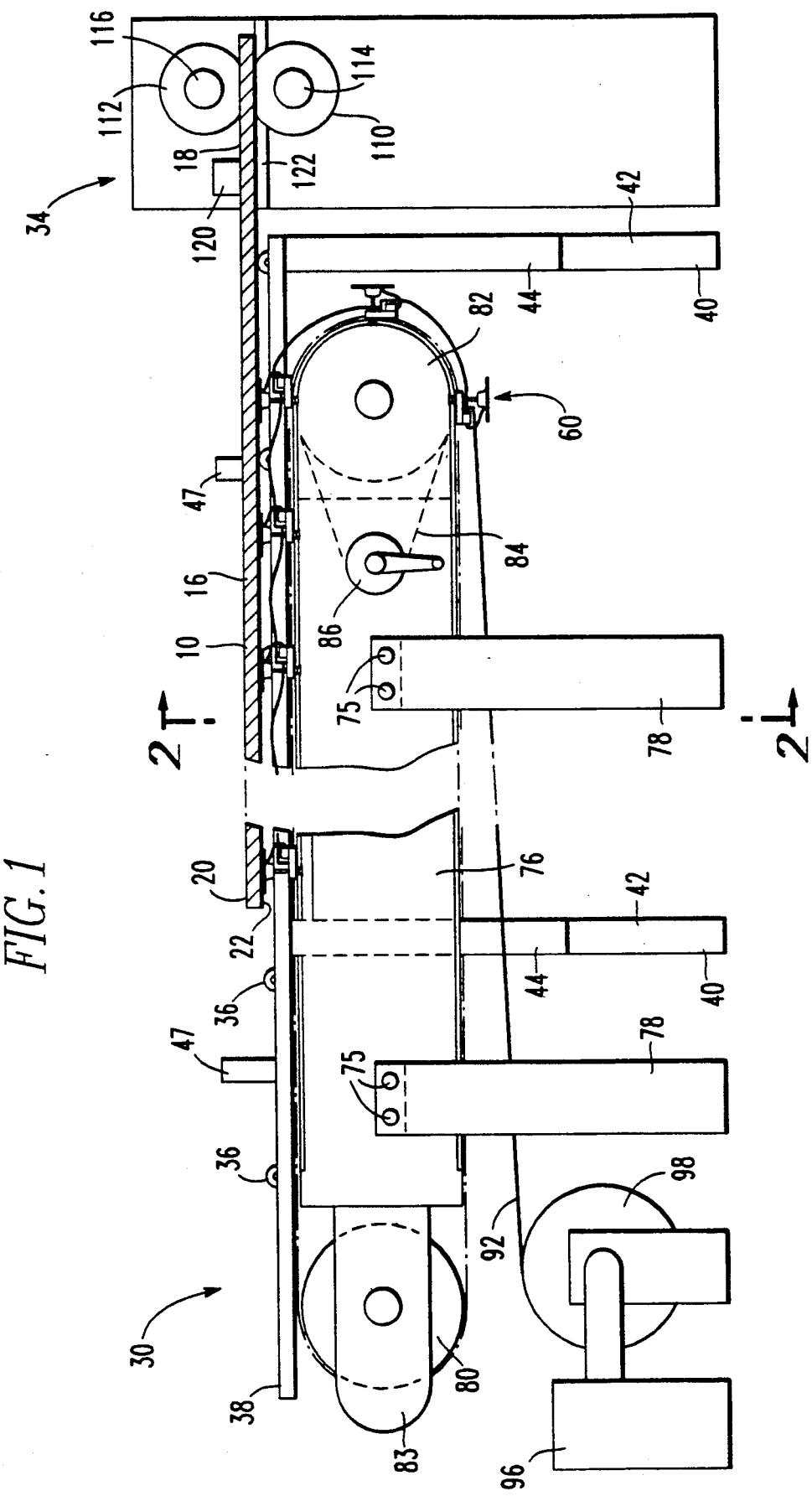
FIG. 1 is a schematic representation of a metal strip on a conveyor and engaging spaced vacuum alignment control cups as it advances to a slitter.
Figure 2:
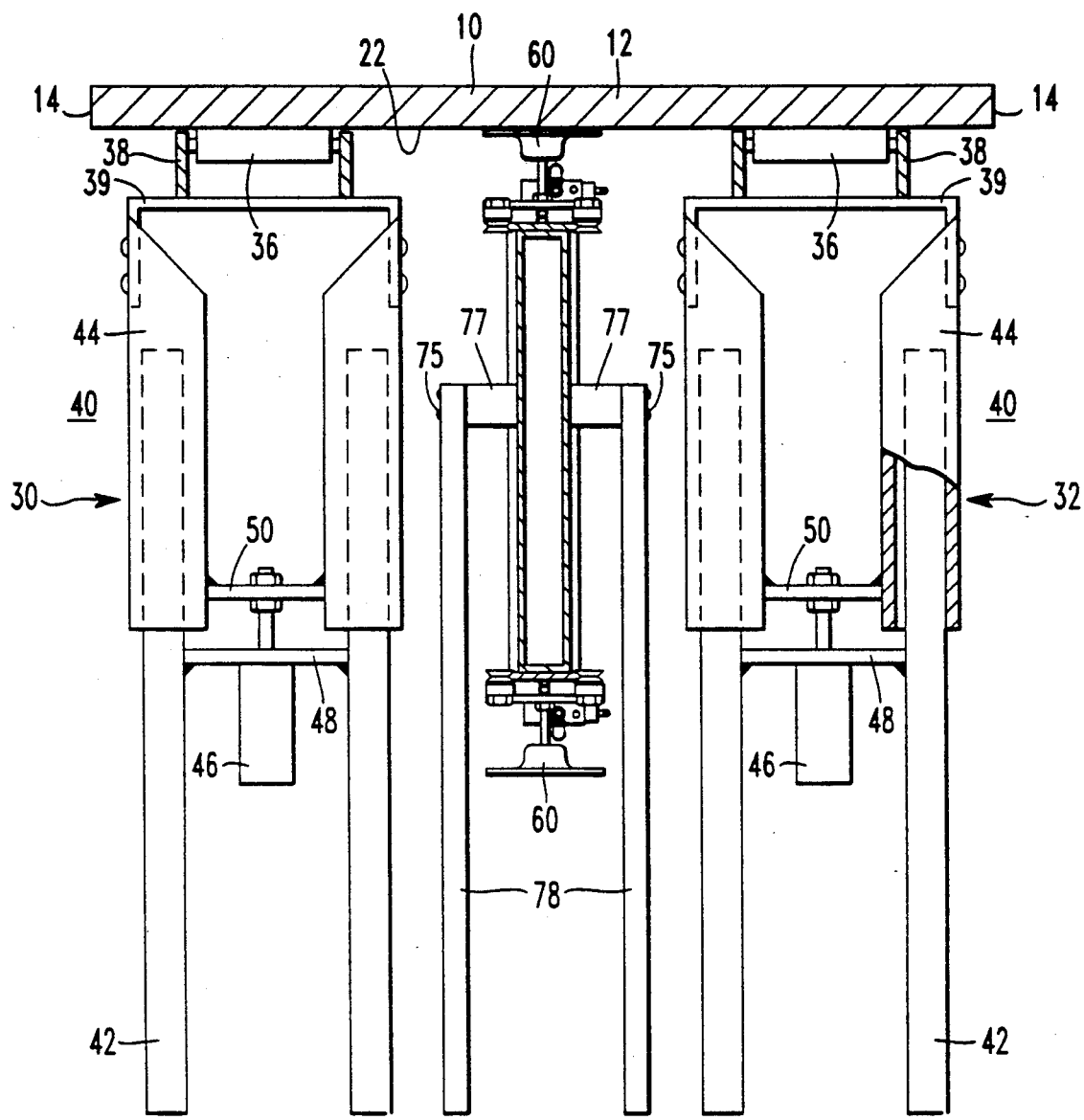
FIG. 2 is an enlarged cross-sectional view of the metal strip on the conveyor of FIG. 1 taken along section line 2—2.

FIGS. 1 and 2 generally show a metal strip 10 having a width 12 extending between two side edges 14, a length 16 extending from a leading edge 18 to a trailing edge 20 and a bottom surface 22.

In the preferred practice of the present invention, the metal strip is essentially comprised of zirconium and, most preferably, is Zircaloy 2, Zircaloy 4 or Zirlo. The thickness of the strip 10 is generally less than about one quarter of an inch and most preferably is from about one sixteenth of an inch to about one eighth of an inch. The width 12 of the strip 10 may be about 24 inches or more. The length 16 may be up to about fifteen feet or more. In the preferred practice, one half inch wide edges are trimmed from the outer edges of a twenty three inches wide zirconium strip as it is slit into two eleven inches wide elongated pieces. It will be appreciated that other widths and trims may be cut in other practices. Also, other non-ferrous and ferrous metals and their alloys may be similarly processed in other practices.

As shown in FIGS. 1 and 2, the metal strip 10 is disposed on two parallel spaced apart conveyors 30 and 32, which are adjacent a slitter 34. Each of the conveyors 30, 32 has a series of rollers 36 mounted on a frame 38, which is supported by legs 40. As is shown, frame 38 may be bolted to the legs 40 via an intermediate member 39, alternatively, the frame 38 may be joined to the legs 40 via other conventional means. Each leg 40 has a lower member 42 and a tubular upper member 44 which telescopes out of the lower member 42 when an air cylinder 46 mounted to cross-members 48 and 50 is actuated to raise the conveyor 30 or 32. Heavy duty air cylinders 46 having bores of about one and three quarter inches are needed for raising the conveyors 30 and 32. A suitable air cylinder is commercially available from the Bimba Corporation. As shown in FIGS. 1 and 2, the conveyors 30 and 32 are in the lower position and the air cylinders 46 are not actuated. Any suitable alignment tabs 47 may be used for aligning the strip 10 with respect to the slitter 34 when the conveyors 30 and 34 are in the raised position.

Figure 3:
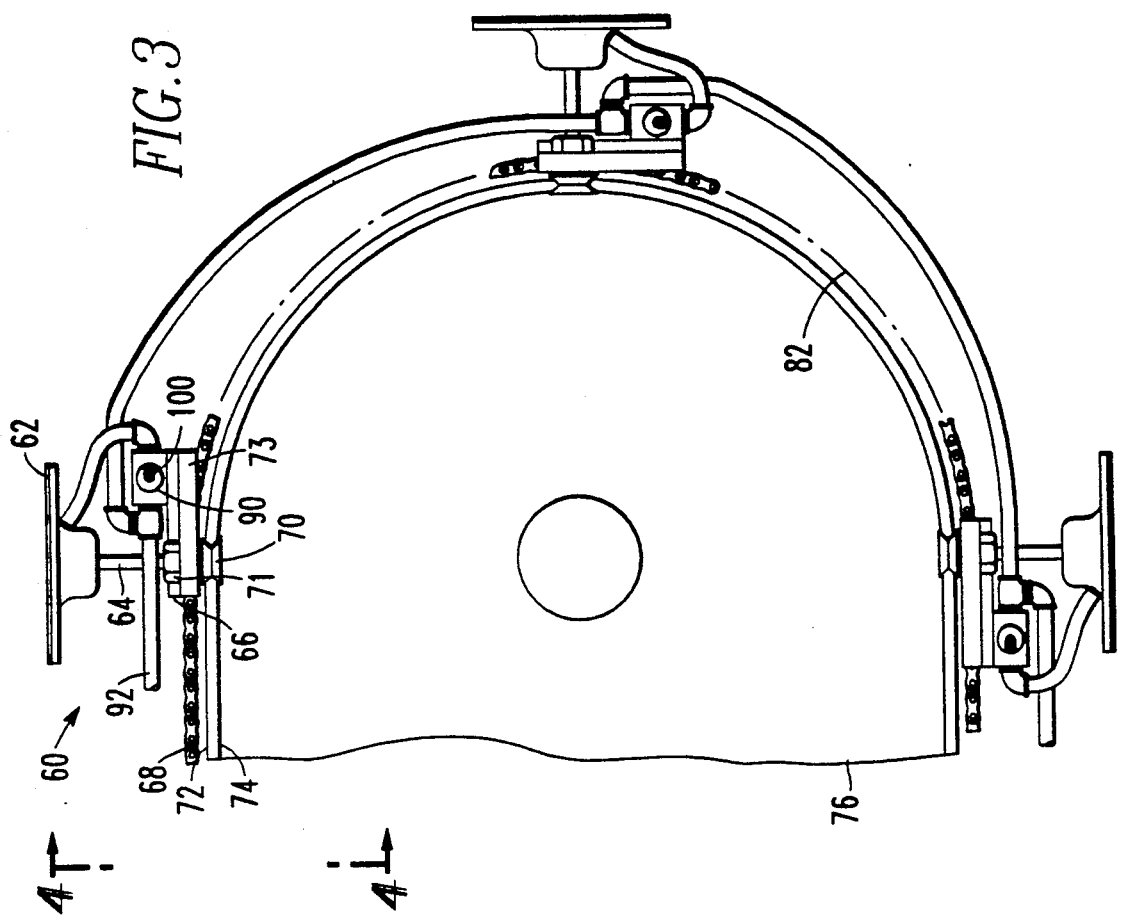
FIG. 3 is an enlarged detail view of the end of the conveyor adjacent the slitter as shown in FIG. 1.

Vacuum cup assemblies 60 are disposed between the conveyors 30 and 32 along the length 16 of the strip 10. The assemblies 60 have vacuum cups 62 (best seen in FIGS. 3 and 4), which may be spaced about two feet apart or more, for engaging the bottom surface 22 of the strip 10 in order to maintain the alignment of the trailing end 20 of the strip 10 as the leading end 18 is advanced into the slitter 34.

Each vacuum cup 62 is pivotally supported on a ball (not shown) of a shaft 64 fastened by a nut 65 to a trolley 66, which is attached by fasteners 67 to a endless roller chain 68. Each trolley 66 has a pair of rotatable track followers 70 which engage the opposite edges 72 of a guide plate 74 mounted on a frame 76. Each track follower 70 is fastened to the trolley 66 by a bolt 71, which also extends through an interposed shim 73 so that the follower 70 may engage the guide plate 74 beyond the roller chain 68. The frame 76 is fastened by bolts 75 to support plates 77 to form an assembly which stand on legs 78. The legs 78 are sufficiently spaced to permit the vacuum cup assemblies 60 to pass between them.

Figure 4:
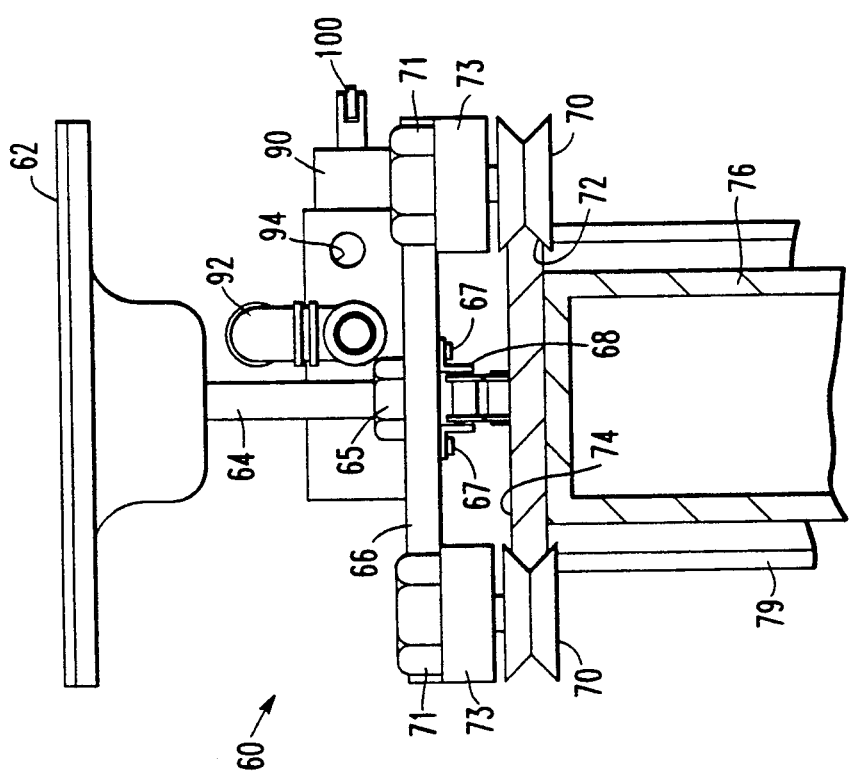
FIG. 4 is an enlarged partially sectioned side view of a vacuum cup assembly as shown in FIG. 3.

As is shown in FIG. 4, the guide plate 74 extends along the top and bottom edges of the frame 76 and also around the end 79 of the frame 76 for guiding the vacuum cup assemblies 60 as the strip 10 is advanced to the slitter 34. The edges 72 of the guide plate 74 may comprise two surfaces extending at an angle of 45° to the centerline of the guide plate 74 (as is shown) or have other suitable configuration. The roller chain 68 is driven between an idler sprocket 80 and a drive sprocket 82. Preferably, the idler sprocket 80 is supported in a yoke 83 at one end of the frame 76 and the drive sprocket 82 is supported in a recess in the other end 79 of the frame 76. The end 79 of the frame 76 has a semicircular shape which extends beyond the sprocket 82 so that the vacuum cup assemblies 60 are continuously guided while they make a 180° turn around the sprocket 82. As shown, the drive sprocket is driven by a chain 84, which in turn may be driven by a hand crank 86 (as is shown) or by a motor means (not shown).

Each vacuum cup 62 is controlled by a three way valve 90 which is connected to a vacuum line 92 and is ported to the air via a port 94. The vacuum is generated by a vacuum pump 96 (shown in FIG. 1) and is applied to the vacuum line 92 via a take-up reel 98. The control valve 90 has an actuator 100 which is released near the sprocket 82 to open the vacuum cup 62 to the atmosphere and thereby relieve the vacuum in the cup 62 as the metal strip 10 leaves the conveyors 30 and 32.

The slitter 34 shown in FIG. 1 has three sets of cooperating circular cutting knives such as knives 110 and 112 disposed on shafts 114 and 116, respectively. A metal strip 10 advances through slitter guides 120 adjacent a slitter table 122 and through the three sets of cutting knives 110 and 112 and is simultaneously trimmed and slit into two lengthwise pieces. Preferably, the strip 10 is pulled from the conveyors 30 and 32 and into the slitter 34 by the cutting knives 110 and 112 (as is indicated) or by powered rollers (not shown).

In the preferred practice of the present invention, with the vacuum cup assemblies 60 on the lower portion of the guide plate 72, a metal strip 10 is placed upon the conveyors 30 and 32. The conveyors 30 and 32 are raised by actuating the air cylinders 46. The strip 10 is aligned with respect to the slitter 34 by alignment tabs 47 or sensors coupled with an alignment mechanism (not shown). The vacuum cup assemblies 60 attached to the roller chain 68 are moved to the upper portion of the guide plate 74 by rotating the hand crank 86. The air cylinders 46 are then vented to lower the conveyors 30 and 32 and thereby bring the strip 10 into engagement with the vacuum cups 62. The vacuum is then applied to the cups 62 by the vacuum pump 96 for holding the strip 10 in alignment.

The slitter 34 is then powered and the strip 10 is advanced to the slitter 34 by the hand crank 86. Once started into the slitter 34, the strip 10 is pulled through the slitter 34 by the three sets of cutting knives 110 and 112. The vacuum cup assemblies 60 are pulled by the metal strip 10 along the upper portion of the guide plate 74 and toward the slitter 34. As each vacuum cup assembly 60 is pulled near the sprocket 82, the actuator 100 is released from a trip plate (not shown) and the vacuum in the cup 62 is relieved via port 94. The released assembly 60 is carried around the semicircular end 79 of the frame 76 and along the lower portion of the guide plate 74 by the roller chain 68.

After the last vacuum cup assembly 60 has disengaged from the strip 10 and the strip 10 has passed through the slitter 34, the two lengthwise pieces continue to travel onto a table or down a conveyor to the next step of the process (not shown). The two pieces are sufficiently straight for subsequent operations and the surfaces of the strip are subjected to far less handling damage by the slitting process. The trimmed edges are set aside and later recycled.

While a preferred practice and an embodiment of the present invention have been shown and described, it is to be distinctly understood that the invention is not to be limited thereto but may be otherwise variously embodied within the scope of the following claims.

We claim:

1. An overwidth slitting method for slitting a metal strip into two lengthwise pieces while trimming the side edges from the strip, comprising the steps of:

placing a metal strip, the strip having a width extending between two side edges, a length and a bottom surface, on parallel spaced apart conveyors disposed adjacent a slitter for conveying the strip to the slitter;

raising the conveyors above a plurality of vacuum cups disposed between the conveyors and spaced along the length of the strip;

aligning the raised metal strip with respect to the slitter;

lowering the raised conveyors to a position where the bottom surface of the aligned strip engages the vacuum cups disposed between the conveyors;

applying a vacuum to the vacuum cups for holding the strip in alignment; and then advancing the metal strip on the conveyors to the slitter while sequentially releasing the vacuum from each vacuum cup engaged with the bottom surface of the metal strip as it advances; and simultaneously slitting the metal strip into two lengthwise while trimming the side edges from the two lengths.

2. The method of claim 1, wherein a zirconium strip is slit into two lengthwise pieces.

3. The method of claim 2, wherein the zirconium strip has a thickness of between about one sixteenth of an inch and one eighth of an inch.

4. The method of claim 3, wherein the zirconium strip has a length of at least about fifteen feet.

5. Overwidth slitting apparatus for slitting a metal strip into two lengthwise pieces while trimming the side edges from the strip, comprising:

slitter means for cutting a metal strip, the strip having a width extending between two side edges, a length and a bottom surface, into lengthwise pieces and simultaneously trimming the side edges therefrom;

parallel spaced apart conveyors disposed adjacent the slitter for conveying the strip to the slitter;

a plurality of spaced apart vacuum cups attached to an endless chain interposed between the conveyors;

means for raising and lowering the conveyors relative to the vacuum cups;

means for aligning a raised metal strip on the conveyors with respect to the slitter;

means for applying a vacuum to the vacuum cups for holding the strip in alignment as a strip advances on the conveyors to the slitter; and means for sequentially releasing the vacuum from each vacuum cup as a strip on the conveyors advances to the slitter.

6. The apparatus of claim 5, wherein the chain extends between two sprockets mounted at ends of a frame and the vacuum cups are attached to the chain by a trolley, the trolley having a pair of spaced apart track followers operatively engaged with a guide track mounted on the frame supporting the two sprockets, whereby the chain is supported by the trolley as it travels between the sprockets.

7. The apparatus of claim 6, wherein the track guide is comprised of two edges of a plate supported by the frame.

8. The apparatus of claim 7, wherein the edges of the plate are each comprised of two surfaces which extend at an angle to each other and the track followers operatively engage both surfaces of each plate edge.

* * * * *